(12) United States Patent
Lutzke et al.

(10) Patent No.: US 12,338,887 B2
(45) Date of Patent: Jun. 24, 2025

(54) SCALABLE TRANSMISSION HOUSING, AND HOUSING SERIES

(71) Applicants: Flender GmbH, Bocholt (DE); Flender Industriegetriebe GmbH, Penig (DE)

(72) Inventors: Robert Lutzke, Leipzig (DE); Andreas Fiedler, Waldenburg (DE); Rocco Fischer, Chemnitz (DE); Sascha Ruppert, Dresden (DE); Jörg Buhl, Neukirchen (DE); Andreas Angenendt, Bocholt (DE); Gerd Hauser, Zwickau (DE)

(73) Assignees: Flender GmbH, Bocholt (DE); Flender Industriegetriebe GmbH, Penig (DE)

( * ) Notice: Subject to any disclaimer, the term of this patent is extended or adjusted under 35 U.S.C. 154(b) by 122 days.

(21) Appl. No.: 18/011,048

(22) PCT Filed: Jun. 18, 2021

(86) PCT No.: PCT/EP2021/066547
§ 371 (c)(1),
(2) Date: Dec. 16, 2022

(87) PCT Pub. No.: WO2021/255220
PCT Pub. Date: Dec. 23, 2021

(65) Prior Publication Data
US 2023/0220912 A1    Jul. 13, 2023

(30) Foreign Application Priority Data
Jun. 19, 2020    (EP) .................................... 20181157

(51) Int. Cl.
*F16H 57/021*    (2012.01)
*F16H 57/02*    (2012.01)

(52) U.S. Cl.
CPC . *F16H 57/021* (2013.01); *F16H 2057/02069* (2013.01)

(58) Field of Classification Search
CPC ...................................................... F16H 57/021
See application file for complete search history.

(56) References Cited

U.S. PATENT DOCUMENTS 2,623,406 A    10/1950    Hansen
3,681,919 A  *  8/1972    Forster .................. F01B 3/0091
                                                    60/458

(Continued)

FOREIGN PATENT DOCUMENTS

DE    44 13 759    10/1995
DE    102016209549    12/2017

(Continued)

OTHER PUBLICATIONS

International Search Report Issued by the European Patent Office in International Application PCT/EP2021/066547 on Sep. 8, 2021.

*Primary Examiner* — Daniel D Yabut
(74) *Attorney, Agent, or Firm* — Henry M. Felereisen LLC

(57) ABSTRACT

A transmission housing includes a profile body configured to enclose transmission components, two side walls configured to enclose the transmission components in the profile body, and a hub rail inserted into a recess of one of the two side walls and fastened to the one of the two side walls. The hub rail includes at least two hubs and is defined by a hub width which is higher than a wall thickness of each of the two side walls. The profile body, the two side walls and the hub rail are each configured without joints in a radial direction of the at least two hubs in order to prevent radial insertion of a one of the transmission components into the hubs.

11 Claims, 3 Drawing Sheets

(56) References Cited

U.S. PATENT DOCUMENTS

| | | | |
|---|---|---|---|
| 3,713,494 A | | 1/1973 | Berdrin |
| 4,601,643 A | * | 7/1986 | Seidel .................. F01C 21/008 |
| | | | 417/247 |
| 4,879,924 A | | 11/1989 | Holthoff et al. |
| 2014/0371028 A1 | * | 12/2014 | Billmeyer ................ F16H 1/46 |
| | | | 475/337 |
| 2016/0265650 A1 | * | 9/2016 | Wu ......................... F16H 57/03 |
| 2018/0066653 A1 | * | 3/2018 | Marette ................ F16H 57/021 |
| 2019/0170238 A1 | * | 6/2019 | Kämmerer .......... F16H 57/0454 |

FOREIGN PATENT DOCUMENTS

| | | | | |
|---|---|---|---|---|
| EP | 0 686 788 | | 12/1995 | |
| EP | 1 203 903 | | 5/2002 | |
| EP | 1 781 965 | | 1/2009 | |
| EP | 2256373 A1 | * | 12/2010 | .............. F16C 19/54 |

\* cited by examiner

SCALABLE TRANSMISSION HOUSING, AND HOUSING SERIES

CROSS-REFERENCES TO RELATED APPLICATIONS

This application is the U.S. National Stage of International Application No. PCT/EP2021/066547, filed Jun. 18, 2021, which designated the United States and has been published as International Publication No. WO 2021/255220 A1 and which claims the priority of European Patent Application, Serial No. 20181157.7, filed Jun. 19, 2020, pursuant to 35 U.S.C. 119 (a)-(d).

The invention relates to a transmission housing which can be scaled by way of a modular construction. The invention also relates to a housing series for transmissions which comprises a plurality of housings which are based on the transmission housing according to the invention. Furthermore, the invention relates to an industrial application with a transmission with a corresponding housing, and to a computer program product for simulating an operating behavior of a transmission of this type.

US 2014/371028 A1 has disclosed a modular housing for a planetary transmission which comprises a profile component which is provided with covers, namely an output cover and a motor cover. The covers can be welded to the profile component. The housing can be provided with a motor, with the result that a gear motor is implemented.

Document EP 1 781 965 A1 discloses a housing for a multiple-stage transmission which is configured in at least two variants. In one wall of the housing, different bores are configured which are positioned differently. Different variants of the transmission can be produced by way of selection of bores, in which shafts are to be received.

U.S. Pat. No. 4,879,924 A has disclosed a transmission housing with sleeve-shaped bearing bushes for mounting shafts.

EP 0 686 788 A1 has disclosed a transmission housing which can be closed by way of a cover and in the case of which transmission components can be inserted via an opening of the transmission housing, which opening can be closed by the cover.

Further transmission housings are known from DE 10 2016 209 549 A1 and U.S. Pat. No. 2,623,406 A.

Transmissions are used hi a wide spectrum of applications, in which high requirements are made of the mechanical performance. At the same time, a simple, rapid production capability is envisaged for transmissions of this type. Furthermore, a satisfactory adaptability to existing installation spaces and use scenarios is envisaged. The invention is based on the object set of providing a possibility which affords an improvement in at least one of the aspects outlined above.

SUMMARY OF THE INVENTION

The object set is achieved by way of a transmission housing as set forth hereinafter, a housing series as set forth hereinafter, a transmission as set forth hereinafter, an industrial application as set forth hereinafter and a computer program product set forth hereinafter. Preferred refinements of the invention are specified in the subclaims and the following description which, in each case individually or in combination, can represent one aspect of the invention.

One aspect of the invention relates to a profile body for enclosing transmission components, two side walls for enclosing the transmission components in the profile body, and a hub rail which has at least two hubs, is inserted into a recess of one of the side walls and is fastened to this side wall, the profile body, the side walls and the hub rail being configured without joints in order to prevent radial insertion of one of the transmission components into the hub.

Torque-transmitting transmission components such as, for example, shafts and gearwheels can be inserted into a volume which is delimited at least partially by the profile body. To this end, the profile body can run radially outside the transmission components and can be of open configuration on the end side, in the axial direction along a rotational axis of the transmission components, To this end, the profile body is, for example, of frame-like configuration, it being possible for the profile body to be of completely closed configuration in a ring-like manner in the circumferential direction or, for example, to be of partially open configuration in a substantially U-shaped manner. The material of the profile body can enclose the transmission components at least partially, preferably for the most part or completely in the circumferential direction. The end-side openings of the profile body can be at least partially concealed and/or closed by way of the side walls, with the result that the transmission components, apart from shaft pieces which are routed to the outside via the at least one hub of the hub rail, can be enclosed by the profile body and the side walls.

At least one of the side walls has a recess, into which the hub rail is inserted at least partially, in order to close the recess and preferably to fill it substantially completely. In particular, the hub rail has a projecting collar which, in the case of an axial relative movement of the hub rail into the recess, can come into contact with that material of the associated side wall which delimits the recess, in order to limit the plug-in depth of the hub rail into the recess and/or to configure a peripheral edge for a fillet welded connection to the side wall. The hub rail can comprise a plurality of hubs which are configured to receive in each case at least one bearing, in which in each case one shaft of the transmission can be received rotatably. The plurality of hubs can be positioned in the common hub rail offset laterally with respect to one another by a defined axial spacing, with the result that different gearwheel shafts can be mounted in the plurality of hubs at a predefined axial spacing from one another. The predefined axial spacing can correspond with a defined transmission ratio which is provided by way of different gearwheels of the respective gear shaft. This makes it possible for respective identically configured profile bodies and side walls to be used for a transmission series with different power output profiles and/or overall transmission ratios, and for merely different profile rails which differ in terms of the arrangement and/or size of the hubs to be used for the different transmissions of the transmission series.

During operation of the transmission, the hub rail is subjected to the reaction forces which result in the bearings as a result of a torque-transmitting contact between the gearwheels. The profile body can be substantially a prismatic body, by way of which a housing wall is provided at least partially in different spatial directions. The side walls are substantially flat components which can be produced, for example, from a plate material. The hub rail can be configured in one piece, with the result that the individual bearing bores cannot be split by dismantling. The respective hub of the hub rail is of continuously closed configuration in the circumferential direction and can be delimited by way of a continuously running material of the hub. The respective hub can have a radially inwardly pointing inner face which is of completely continuous configuration, in particular in the manner of a single-piece sleeve. The inner face of the respective hub can configure, in particular, a plain bearing face for configuring a plain bearing for the transmission component, which is plugged axially into the hub, in particular a gear shaft. It is also possible, however, that a separate bearing, in particular a plain bearing or an antifriction bearing, is provided in the hub so as to make direct contact with the inner face, A joint, by way of which the hub might be separated into two shell halves, is not provided, as a result of which the hub is configured without joints. A shaft end and/or bearing received in the hub can be inserted into the hub as a result merely by way of an axial relative movement, whereas a relative movement in the radial direction is blocked by way of the material of the hub rail. During assembly of the transmission, for example, a side wall, in which a profile rail can be received, can be connected to the profile body and then the transmission components can be inserted. Subsequently, the other side wall, in which a profile rail can be received, can be connected to the profile body, it being possible, in particular, for shaft pieces of transmission components to be plugged axially into the associated hub of the profile rail at the same time. As a result, a multiplicity of different transmissions can be produced rapidly and simply.

Here, a joint of the transmission housing which is configured without joints is to be understood to mean a dividing plane, by way of which transmission housings according to the prior art can be split without destruction substantially along the hubs and/or the bearing bores for shaft bearings in the case of dismantling.

With the profile body, the side walls and the hub rail, the transmission housing according to the invention therefore comprises separate components which can be produced independently of one another. Accordingly, the hub rail, the side walls and the profile body can be designed in each case in a load-appropriate manner. For example, the hub rail is designed predominantly with regard to thermal loading. A dedicated separate manufacturing technique can likewise be used for each of these components. Accordingly, the transmission housing according to the invention can be produced rapidly and cost-efficiently, Construction compromises such as, for example, in the case of casting for housing components with a joint can thus be avoided. Furthermore, as a result of the separate production capability of profile body, hub rail and side walls, the transmission housing according to the invention provides a high degree of flexibility. The profile body, the side walls and the hub rail can be adapted in each case separately to different requirements made of the associated transmission. The profile body without joints is preferably configured in one piece, with the result that the profile body does not have to be assembled from separate part bodies via a joint. In particular, the respective side wall which is free from joints is configured in one piece, with the result that the respective side wall does not have to be assembled from separate part walls via a joint. The respective hub rail which is free from joints is particularly preferably configured in one piece, with the result that the respective hub rail does not have to be assembled from separate part rails via a joint, Here, the transmission can be configured as a spur gear transmission, a bevel gear transmission, a straight bevel gear transmission, a worm gear transmission or a hypoid transmission.

In one embodiment of the claimed transmission housing, the profile body is closed at least partially on both sides by the side walls. To this end, the side walls are arranged on open sides of the profile body, with the result that the transmission housing is fluid-tight, that is to say is suitable for receiving a lubricant, for example oil, without leaks. The rigidity of the profile body is increased by way of the side walls which are fastened to the profile body. This allows a profile body to be used which separately has a reduced rigidity. As a consequence of this, a sufficient rigidity for absorbing reaction forces on the hub rail on the basis of simple components is provided in the claimed transmission housing.

Furthermore, at least one of the side walls can be connected in an integrally joined manner to the hub rail and/or the profile body. Two side walls can likewise also be connected in an integrally joined manner to the hub rail and/or the profile body. Here, the integrally joined connection can be configured as a welded joint. Welded joints provide a high degree of load-bearing capability and a reliable sealing action in the long term. The welded bonds can be produced by means of inert-gas welding, that is to say MSG processes, for example via MIG welding or MAG welding. Furthermore, welded joints can be produced in an automated manner, for example by means of a robot. As a result, the claimed transmission housing makes an increased degree of automation during production and therefore an increased cost efficiency possible. As an alternative or in addition, the integrally joined connection can also be produced by way of soldering or adhesive bonding.

Moreover, at least one welded seam, by way of which an integrally joined connection is produced between the side wall and the hub rail or the profile body, can be configured on an outer face of the side wall. An outer side is to be understood to mean that side of the side wall which is accessible in the assembled state of the transmission housing. As a result, there is accessibility during the production of the transmission housing, which further simplifies the automation of the production. In particular, programming of travel paths for the robot is simplified. The use of small welding heads is likewise unnecessary. Furthermore, further machining, such as, for example, polishing off, of the welded seam is dispensable. The welded seam is not wetted with lubricant during operation of the transmission, as a result of which a contamination of the lubricant is avoided. The production of the claimed transmission housing is thus accelerated further.

In a further embodiment of the claimed transmission housing, the profile body is configured in one piece. To this end, the profile body can be produced from a flat strip material or sheet material which is reshaped by bending over at the edges, Strip material or sheet material of this type is fluid-tight, in particular against lubricant, can be processed simply and is cost-efficient. At the same time, material of this type can be used flexibly for different shapes of the profile body, as a result of which the variety of components for different models of the transmission housing is decreased. Accordingly, the claimed transmission housing provides an increased degree of cost effectiveness. As an alternative, the profile body can also be produced from a cast material, for example via spheroidal graphite iron.

Furthermore, the claimed transmission housing can be provided with an inspection hole frame. The inspection hole frame can be provided with a removable cover and affords visual access to the transmission in the claimed transmission housing. The inspection hole frame can be configured to connect end edges of the profile body to one another. Accordingly, the profile body which can be of substantially C-shaped configuration can be supplemented to form a closed cross section. As a result, the achievable rigidity of the profile body is increased further. The inspection hole frame can have projecting attachments, between which the profile body and at least one side wall, preferably two side walls which are spaced apart from one another over the profile body, can be received, preferably can be held together and/or clamped.

Furthermore, the hub rail in the claimed transmission housing can be of slot-shaped, oval, droplet-shaped, square or polygonal configuration. As a result, the shape of the hub rail can be adapted readily to the required diameters and/or position of the bearing bores and/or hubs. The hub rail can likewise be adapted to different requirements. For example, a square hub rail provides an increased degree of rigidity, an oval hub rail provides a favorable vibration behavior, and a polygonal hub rail provides an increased heat dissipation. The shape of the hub rail can be selected independently of the side walls and the profile body. Furthermore, a wall thickness, that is to say a dimension of a peripheral edge around the bearing bores, can therefore be adapted to the reaction forces which are present in the hub rail. This makes load-appropriate dimensioning of the hub rail and the efficient use of high-performance materials during the production of the hub rail possible. As a result of the omission of the joint, the hub rail can be configured in one piece, which in turn provides an increased degree of strength. In this way, strength reserves can readily be achieved, by way of which dismantling of the transmission housing during the technically appropriately utilizable service life of the transmission is superfluous. The supposed disadvantage which results from the omission of the joint is compensated for at least partially as a result.

In the claimed transmission housing, furthermore, the side walls and/or the two hub rails can be of mirror-inverted configuration with respect to one another. In addition, the side walls and/or the two hub rails can also be configured such that they are structurally identical to one another, that is to say can be exchanged for one another. Mirror-inverted shapes of hub rails and/or side walls can be produced in a simple way, as a result of which a high degree of cost effectiveness can be achieved. The use of structurally identical hub rails and/or side walls on the claimed transmission housing implements the principle of identical part use, which further simplifies the production of the claimed transmission housing.

Furthermore, at least one rib can be arranged on the claimed transmission housing, by way of which at least one rib a rigidity of the transmission housing, for example a torsional rigidity, is increased. A position on the outer face of a side wall can be selected for the at least one rib. The claimed transmission housing provides structural freedom to such an extent that the position of the at least one rib can be selected substantially freely. Accordingly, an increased improvement of the rigidity of the transmission housing can be achieved by way of a minimum of ribs which are to be connected to the transmission housing in additional processing steps. As a consequence, the claimed transmission housing can also be adapted rapidly and simply to applications with increased mechanical requirements.

The underlying set object is also achieved by way of a housing series for transmissions. The housing series comprises a plurality of transmission housings which in each case have a profile body which is closed by two side walls. The respective transmission housing of the housing series can be filled with at least partially different transmission components, as a result of which a transmission series which can be produced inexpensively is provided. The transmission housing can be configured and developed, in particular, as described above. A hub rail is arranged in at least one of the side walls, which hub rail is configured to receive bearings for a shaft of the respective transmission. The profile body, the side walls and the at least one hub rail of the transmission housing which belong to the housing series are configured without joints. The housing series is based, inter alia, on the finding that an omission of a joint permits a modular production of separate components such as the profile body, the side walls and hub rails, as a result of which the production of the housing series is simplified. The simplicity of the respective components, that is to say of the profile body, the side walls and the hub strip, readily permits an adaptation of the transmission housings to different intended purposes. As a consequence of the scalability achieved in this way of the transmission housings in the housing series according to the invention, this provides an increased model variety which can be achieved at the same time at a minimum of blanks and semi-finished products which are to be kept in store.

In one embodiment of the claimed transmission series, it has two transmission housings, that is to say two models, the side walls of which are structurally identical, it being possible for their profile bodies to be different. Structurally identical is to be understood to mean that the side walls of the two transmission housings can be exchanged for one another during assembly of the transmission housings. The two transmission housings have profile bodies which in each case have a different profile depth. Here, the profile depth represents that dimension of the profile body which is limited by way of the side walls which are arranged opposite one another, and along which the profile body is of substantially prismatic configuration. The two transmission housings therefore have different dimensions along one direction, as a result of which they are suitable for arranging gearwheels of different width while avoiding empty space in the respective transmission housing. As a consequence, the claimed housing series can be adapted to a wide power range with at the same time an efficient utilization of installation space. Moreover, at least one transmission housing of the housing series can have a hydraulic housing filling degree of from 50% to 80%, preferably of from 60% to 70%. Here, the hydraulic housing filling degree represents the ratio of the space within the transmission housing taken up by transmission components and operating media such as, for example, gearwheels, shafts, bearings and lubricant, and the clear space which is surrounded by the transmission housing. In the case of the operating medium, reference is made to proper filling. As an alternative or in addition, at least one housing of the claimed transmission series can have a mechanical housing filling degree of from 20% to 50%, preferably of from 25% to 40%. Here, the mechanical housing filling degree represents the ratio of the space within the transmission housing taken up by transmission components and the clear space which is surrounded by the transmission housing. Operating media such as lubricant are not taken into consideration. The higher the hydraulic or mechanical housing filling degree, the more efficient the corresponding transmission housing in structural terms. Furthermore, at least one of the transmission housings in the claimed housing series can be configured in accordance with one of the embodiments shown above.

Furthermore, the claimed transmission series can comprise two transmission housings, the side walls of which are structurally identical, it being possible for the profile rails thereof to be different. In the case of these profile rails, the respective hub rails have a different number of bearing bores and/or different arrangements of bearing bores. A hub rail with a different number of bearing bores allows the corresponding different hub rails to be produced from structurally identical blanks or semi-finished products. As a result, the recesses in the associated side walls can be of structurally identical configuration, with the result that an increased commonality between components of different transmission housings in the claimed housing series is achieved. As considered in the corresponding side view of the side walls, different arrangements of bearing bores is to be understood to mean the position of the center points of the respective bearing bores. These can be arranged in a linear manner or along a polyline. The diameters of the respective bearing bores also belong to the arrangement of the bearing bores. As a result, the production of a wide spectrum of transmission housings from a reduced number of blanks and semi-finished products is also simplified. As an alternative or hi addition, an axial height for the respective bearing bores can also be set.

In at least one of the transmission housings hi the claimed housing series, moreover, at least one of the side walls can be connected in an integrally joined manner to the hub rail and/or the profile body. The integrally joined connection can be configured, for example, as a welded joint which can be produced in a simple way hi an automated manner, for example by way of a robot. Welded joints afford a high degree of strength and sealing action against operating media of transmissions, for example lubricants. As a consequence, an increased degree of cost effectiveness is achieved for the claimed housing series. In the case of the production of the corresponding housing, furthermore, the hub rail can first of ail be connected in an integrally joined manner to the associated side wall in order to form an assembly. The assembly in turn can be connected afterwards to the profile body. As a result, the handling operations of heavy and bulky components are reduced. As an alternative, the integrally joined connection can also be produced by way of soldering or adhesive bonding.

In a further embodiment of the claimed housing series, a welded seam is configured to connect the side wall to the hub rail or the profile body on an outer face of the side wall. The welded seam can be of non-machined configuration, that is to say not polished off, not smooth-ground, etc. A contamination of lubricant as a result of contact with the welded seam is avoided by way of the configuration of the welded seam on the outer face of the side wall, with the result that further machining such as, for example, polishing off is superfluous. As a result, the production of the claimed housing series is simplified further.

The set object described at the outset is also achieved by way of a transmission according to the invention. As transmission components, the transmission comprises a plurality of shafts and gearwheels which are arranged in a torque-transmitting manner in a transmission housing. The transmission housing can be configured and developed as described above. In addition, the transmission can be part of a transmission series which is configured with the aid of the housing series described above. The transmission can be configured, for example, as a spur gear transmission, a bevel gear transmission, a straight bevel gear transmission, a worm gear transmission or a hypoid transmission. The transmission housing of the transmission can be configured in accordance with one of the embodiments outlined above and/or can be selected from a housing series in accordance with one of the illustrated embodiments.

The described object is likewise achieved by way of an industrial application according to the invention. The industrial application comprises a drive unit, by way of which a drive output is provided for operation of an output unit. The drive unit is connected in a torque-transmitting manner to a transmission in order to transmit the drive power to the output unit. To this end, the drive unit can be configured as an electric motor, an internal combustion engine, a hydraulic motor, a flywheel, or a turbine wheel. The output unit can be a mechanical application, by way of which the function of the industrial application is defined. The industrial application can be configured overall as a mill, a roller grinding mill, a cement mill, a sugar mill, an extruder, a conveyor system, a belt drive, a bucket conveyor, a rock crusher, a roll crusher, a stirring unit, a rotary kiln, a roll press, a roller press, a pump, a fan, a car crusher, a waste compactor, a ship propulsion system, or a lifting apparatus. The drive unit is, to this end, connected to a transmission via which the drive output is transferred to the output unit. According to the invention, the transmission is configured in accordance with one of the embodiments outlined above.

The outlined set object is likewise achieved by way of a computer program product according to the invention which is configured to simulate an operating behavior of a transmission. The transmission comprises a transmission housing, in which shafts, bearings and gearwheels as transmission components and an operating medium are received. The transmission housing can be configured and developed as described above. The operating behavior can include kinematics of transmission components, a deformation behavior of the transmission housing, a flow behavior or thermal behavior of the operating medium, a thermal behavior of the transmission housing, or a combination of a selection therefrom. The computer program product can have a data interface which is configured to transmit present operating states of the transmission as input parameters to the computer program product. Operating states of this type can comprise a rotational speed, a torque, a start-up ramp correlated with the rotational speed or the torque, an ambient temperature, a starting temperature for the operating medium, a prevailing quantity of operating medium and/or a level of the operating medium. Furthermore, the computer program product can have a data interface for outputting simulation results to further simulation-focused computer program products. The claimed computer program product can be configured, for example, as a digital twin. Digital twins of this type are outlined in greater detail, inter alia, in laid-open specification US 2017/286572 A1, The disclosure content of US 2017/286572 A1 is incorporated into the present application by reference. According to the invention, the transmission housing of the transmission to be simulated is configured in accordance with one of the embodiments outlined above. As an alternative or in addition, the transmission housing of the transmission to be simulated is selected from a transmission series in accordance with one of the above-described embodiments. The computer program product according to the invention allows the fundamental transmission housings to be adapted in a simple way to the boundary conditions of an application and thus to implement the technical advantages of the transmission housings to an increased extent. Since the profile body, the side walls and the profile rail of the transmission housing are free from joints, the simulation which is provided by the computer program product does not need to replicate a thermal heat resistance produced by way of a joint, with the result that more precise results can be predicted in the case of the simulation. The accuracy and validity of the simulation of the transmission is improved as a result of the configuration without joints of the transmission housing which is considered in the case of the simulation.

BRIEF DESCRIPTION OF THE DRAWING

In the following text, the invention will be explained in greater detail on the basis of individual embodiments in figures. The figures are to be read in a mutually complementary manner such that identical reference numerals in different figures have the same technical meaning. The features of the individual embodiments can also be combined among one another. Furthermore, the embodiments which are shown in the figures can be combined with the features outlined above. In the figures, in detail.

DETAILED DESCRIPTION OF PREFERRED EMBODIMENTS

Figure 1:
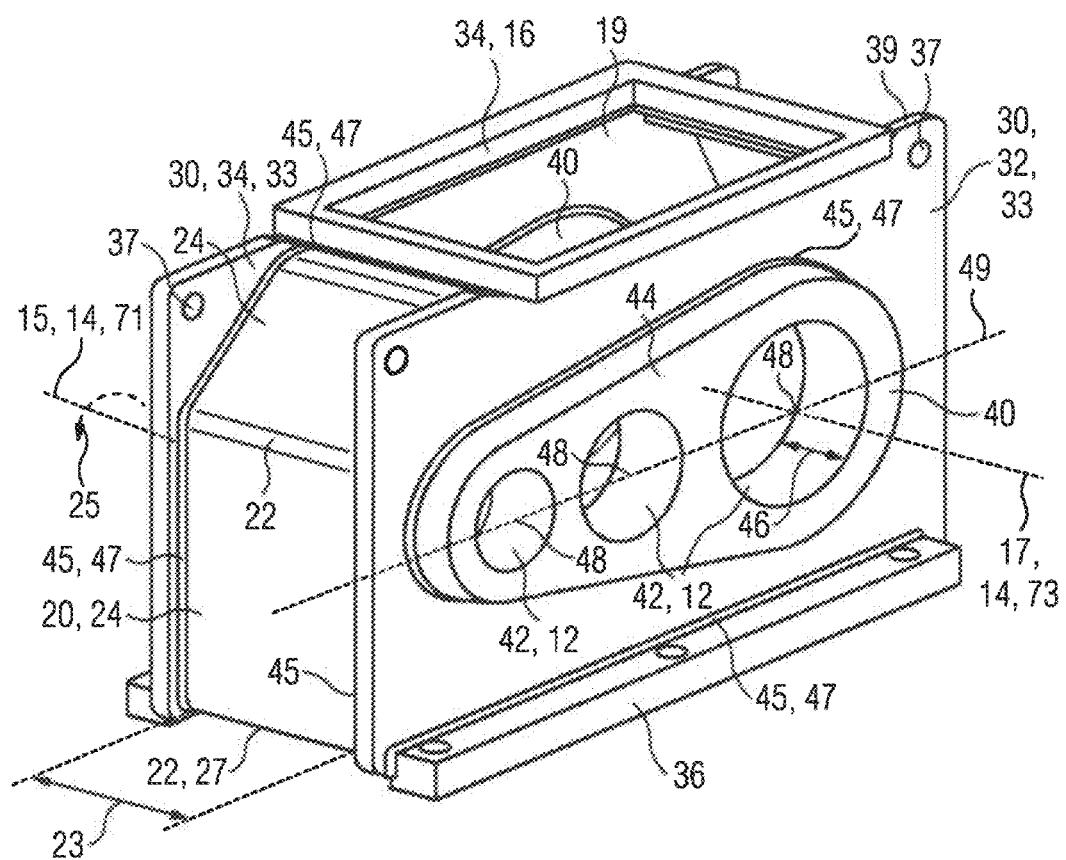
FIG. 1 diagrammatically shows an oblique view of a first embodiment of the claimed transmission housing, FIG. 2 diagrammatically shows an oblique view of a second embodiment of the claimed transmission housing, and FIG. 3 diagrammatically shows a construction of one embodiment of the claimed industrial application.

FIG. 1 diagrammatically shows an oblique view of a first embodiment of the claimed transmission housing 10 which can be used for a claimed transmission 50. Here, the transmission housing 10 belongs to a housing series 60 which comprises a plurality of transmission housings 10 of this type. The transmission housing 10 comprises a profile body 20 which is configured in one piece. The profile body 20 is produced from a strip material which is reshaped by way of angled-over edges 22, Flat portions 24 of the profile body 20 lie between the angled-over edges 22, by way of which flat portions 24 a clear interior space 19 of the transmission housing 10 is enclosed partially. The profile body 20 has a profile depth 23 which can be adapted in a simple way. As a result, the transmission housing 10 can be produced with substantially any profile depth 23 and therefore width. The transmission housing 10 also comprises two side walls 30, namely a first and a second side wall 32, 34 which are arranged so as to lie opposite one another. The side walls 32, 34 are connected in each case to a base rail 36 via integrally joined connections 45. The transmission housing 10 is suitable for a spur gear transmission, in the case of which drive power 25 is fed in along a rotational axis 15 via a transmission input shaft 71. With consideration of mechanical losses, the drive power 25 is conducted out of the transmission housing 10 via a transmission output shaft 73 along a rotational axis 17 arranged in parallel. Accordingly, the first and second side wall 32, 34 are arranged so as to lie opposite one another along the rotational axes 13, 17 of the transmission input shaft 71 and the transmission output shaft 73. Furthermore, the side walls 30, 32, 34 are of mirror-inverted configuration with respect to one another. A hub rail 40 which has a plurality of bearing bores 42 is received in each case in the side walls 30. The bearing bores 42 are configured, in an assembled state of the transmission 50, to receive bearings 12 for shafts 14 which serve, inter alia, as transmission input shaft 71 or transmission output shaft 73. The hub rails 40 on the first and second side wall 32, 34 are of mirror-inverted configuration with respect to one another in a corresponding manner to the side walls 30. The hub rails 40 have substantially a tapering slot shape which is also called oval.

The side walls 30 are connected non-releasably (that is to say, they substantially cannot be released without destruction) to the profile body 20 in each case via at least one integrally joined connection 45 which is configured as a welded seam 47. The integrally joined connection 45 between the respective side wall 30, 32, 34 and the profile body 20 is configured on an outer face 33 of the side wall 30, 32, 34. As a result, the integrally joined connection 45 is accessible in a simple way during assembly of the transmission housing 10, with the result that the integrally joined connection can be produced, for example, by way of a robot (not shown in greater detail). During operation of the transmission 50, the integrally joined connection 45 is not wetted by a lubricant 27 which is received in the clear interior space 19 of the transmission housing 10. Accordingly, a risk of contamination of the lubricant 27 by way of the integrally joined connection 45, that is to say the welded seam 47, is prevented. Further machining of the welded seam 47, for example by way of polishing off, is dispensable. Furthermore, the side walls 30, 32, 34 have lifting eyes 37, by way of which the transmission housing 10 can be lifted by means of a crane.

The hub rails 40 have a rectilinear arrangement 49 of bearing bores 42, that is to say rectilinear positioning of hub center points 48. The bearing bores 42 form hubs and are surrounded by a peripheral edge 44, by way of which the bearing bores 42 are supported. The hub rails 40 are configured as separate components which are connected to the respective side wall 30, 32, 34 in each case by means of an integrally joined connection 45 which is configured as a welded seam 47. The integrally joined connection 45 is arranged on an outer face 33 of the side wall 30, 32, 34 and, as a result, is simply accessible even in the assembled state of the transmission housing 10. The hub rail 40 has a hub width 46, by way of which a maximum bearing width is predefined for a bearing 12 which can be received in the respective hub 42. The hub width 46 is higher than a wall thickness 39 of the side wall 30, 32. Accordingly, the hub rail 40 can be designed substantially independently of the side walls 30, 32, 34. This allows an efficient and weight-saving use of materials. The hub rail 40 can be produced from a material with a higher load-bearing capability than the side walls 30, 32, 34. Even in the case of a relatively small wall thickness 39 of the side walls 30, 32, 34, they are suitable for absorbing transverse forces on shafts 14 which are to be arranged in the transmission housing 10. Furthermore, the profile body 20 is connected to an inspection hole frame 35, by way of which, in the assembled state of the transmission 50, the gearwheels 16 of the latter are accessible. The inspection hole frame 35 is of peripheral configuration and connects open ends of the profile body 20 to one another. The combination of inspection hole frame 35 and profile body 20 thus forms a closed cross section which has an increased rigidity with respect to shear loads and torsion loads. Just like the hub rail 40, the side walls 30, 32, 34 and the profile body 20, the inspection hole frame 35 can be produced separately and can be fastened to the transmission housing 10 by way of an integrally joined connection 45 such as, for example, a welded seam 47. The transmission housing 10 is replicated in a computer program product 80 (not shown in greater detail) in such a way that an operating behavior of a transmission 50 can be simulated, in the case of which transmission 50 the transmission housing 10 is used.

Figure 2:
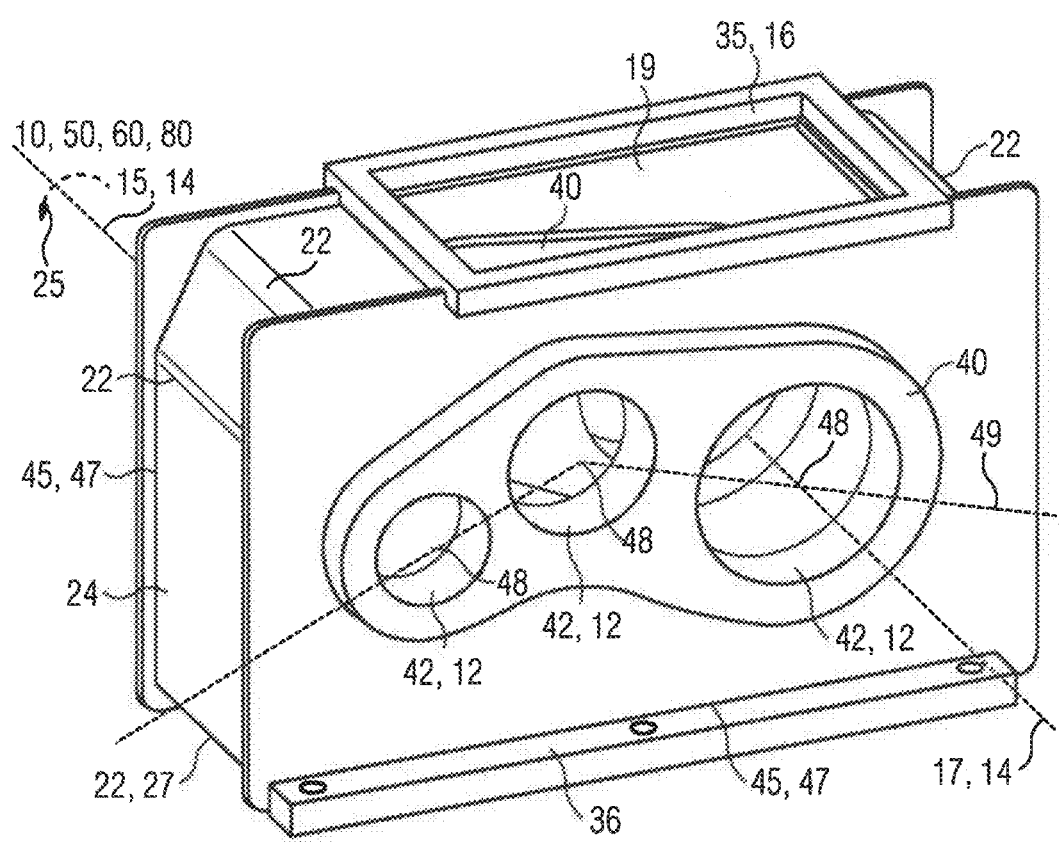

FIG. 2 diagrammatically shows an oblique view of a first embodiment of the claimed transmission housing 10 which can be used for a claimed transmission 50. Here, the transmission housing 10 belongs to a housing series 60 which comprises a plurality of transmission housings 10 of this type. The transmission housing 10 comprises a profile body 20 which is configured in one piece. The profile body 20 is produced from a strip material which is reshaped by way of angled-over edges 22. Flat portions 24 of the profile body 20 lie between the angled-over edges 22, by way of which flat portions 24 a clear interior space 19 of the transmission housing 10 is enclosed partially. The profile body 20 has a profile depth 23 which can be adapted in a simple way. As a result, the transmission housing 10 can be produced with substantially any profile depth 23, and therefore width. The transmission housing 10 also comprises two side walls 30, namely a first and a second side wall 32, 34 which are arranged so as to the opposite one another. The transmission housing 10 is suitable for a spur gear transmission, in the case of which drive power 25 is fed in along a rotational axis 16 via a transmission input shaft 71. With consideration of mechanical losses, the drive power 25 is conducted out of the transmission housing 10 via a transmission output shaft 73 along a rotational axis 17 arranged in parallel. Accordingly, the first and second side wall 32, 34 are arranged so as to lie opposite one another along the rotational axes 13, 17 of the transmission input shaft 71 and the transmission output shaft 73. The side walls 32, 34 are connected via integrally joined connections 45 in each case to a base rail 36. Furthermore, the side walls 30, 32, 34 are of mirror-inverted configuration with respect to one another. A hub rail 40 which has a plurality of bearing bores 42 is received in each case in the side walls 30. The bearing bores 42 are configured, in an assembled state of the transmission 50, to receive bearings 12 for shafts 14 which serve, inter glia, as transmission input shaft 71 or transmission output shaft 73. The hub rails 40 on the first and second side wall 32, 34 are of mirror-inverted configuration with respect to one another in a corresponding manner to the side walls 30. The hub rails 40 have substantially a tapering slot shape which is also called oval.

The side walls 30 are connected non-releasably (that is to say they substantially cannot be released without destruction) to the profile body 20 in each case via at least one integrally joined connection 45 which is configured as a welded seam 47. The integrally joined connection 45 between the respective side wall 30, 32, 34 and the profile body 20 is configured on an outer face 33 of the side wall 30, 32, 34. As a result, the integrally joined connection 45 is accessible in a simple way during assembly of the transmission housing 10, with the result that the integrally joined connection can be produced, for example, by way of a robot (not shown in greater detail). During operation of the transmission 50, the integrally joined connection 45 is not wetted by a lubricant 27 which is received in the clear interior space 19 of the transmission housing 10. Accordingly, a risk of contamination of the lubricant 27 by way of the integrally joined connection 45, that is to say the welded seam 47, is prevented. Further machining of the welded seam 47, for example by way of polishing off, is dispensable. Furthermore, the side walls 30, 32, 34 have lifting eyes 37, by way of which the transmission housing 10 can be lifted by means of a crane.

The hub rails 40 have a polyline-like arrangement 49 of bearing bores 42, that is to say positioning of hub center points 48 offset at an angle. The hub rail 40 can be adapted in terms of its arrangement 49 of the bearing bores 42, without an extensive reconstruction of the side walls 30, 32, 34 and/or the profile body 20 being required. As a result, the transmission housing 10 can be adapted in a simple way to different intended purposes. The bearing bores 42 are surrounded by a peripheral edge 44, by way of which the bearing bores 42 are supported. The hub rails 40 are configured as separate components which are connected to the respective side wall 30, 32, 34 in each case by means of an integrally joined connection 45 which is configured as a welded seam 47. The integrally joined connection 45 is arranged on an outer face 33 of the side wall 30, 32, 34 and, as a result, is simply accessible even in the assembled state of the transmission housing 10. The hub rail 40 has a hub width 46, by way of which a maximum bearing width for a bearing 12 which can be received in the respective hub 42 is predefined. The hub width 46 is higher than a wall/thickness 39 of the side wall 30, 32. Accordingly, the hub rail 40 can be designed substantially independently of the side walls 30, 32, 34. This allows an efficient and weight-saving use of materials. The hub rail 40 can be produced from a material with a higher load-bearing capability than the side walls 30, 32, 34. Even in the case of a relatively small wall thickness 39 of the side walls 30, 32, 34, they are suitable for absorbing transverse forces on shafts 14 which are to be arranged in the transmission housing 10. Furthermore, the profile body 20 is connected to an inspection hole frame 35, by way of which, in the assembled state of the transmission 50, the gearwheels 16 of the latter are accessible. The inspection hole frame 35 is of peripheral configuration and connects open ends of the profile body 20 to one another. The combination of inspection hole frame 35 and profile body 20 thus forms a closed cross section which has an increased rigidity with respect to shear loads and torsion loads. Just like the hub rail 40, the side walls 30, 32, 34 and the profile body 20, the inspection hole frame 35 can be produced separately and can be fastened to the transmission housing 10 by way of an integrally joined connection 45 such as, for example, a welded seam 47. The transmission housing 10 is replicated in a computer program product 80 (not shown in greater detail) in such a way that an operating behavior of a transmission 50 can be simulated, in the case of which transmission 50 the transmission housing 10 is used.

Figure 3:
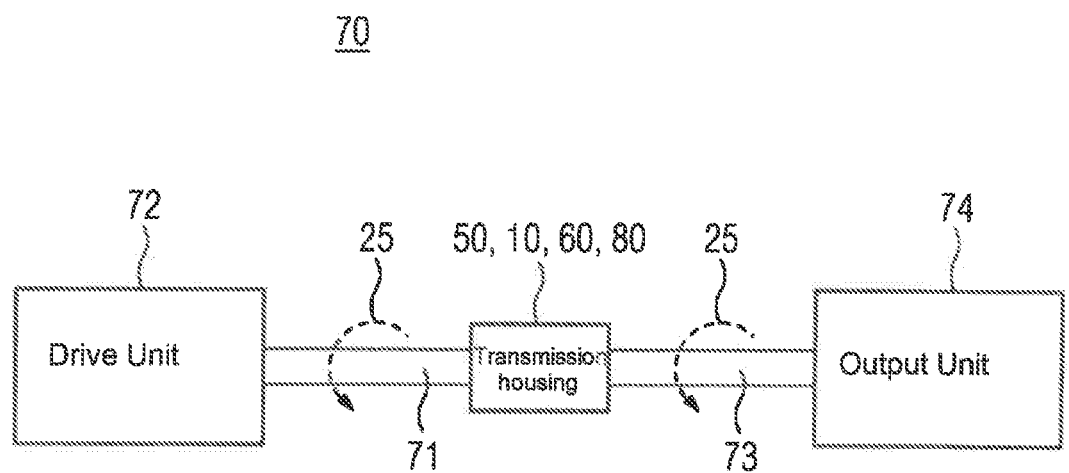

FIG. 3 diagrammatically shows the construction of one embodiment of a claimed industrial application 70 which has a drive unit 72 and an output unit 74. The drive unit can be configured, for example, as an electric motor, internal combustion engine or hydraulic motor. Drive power 25 which is to be transmitted to the output unit 74 is provided by way of the drive unit via an output shaft which serves as transmission input shaft 71. The drive unit 74 can be configured, for example, as a mill, a vertical mill, a sugar mill, a cement mill, a rock crusher, a conveyor belt, a pump, a roller press, a slat conveyor, a tube mill, a rotary kiln, a stewing gear, a stirrer, a bucket conveyor, a belt drive, a lifting apparatus, a waste compactor or a car crusher. To this end, the output unit 74 has an input shaft which is configured as a transmission output shaft 73. The drive unit 72 and the output unit 74 are connected to one another via a transmission 50. The transmission 50 has a transmission housing 10 which is configured in accordance with one of the embodiments outlined above and/or is selected from a housing series 60 which is configured in accordance with one of the described embodiments.

What is claimed is:

1. A transmission housing, comprising:
  a profile body configured to enclose transmission components;
  two side walls configured to enclose the transmission components in the profile body; and
  a hub rail inserted into a recess of one of the two side walls and fastened to the one of the two side walls, said hub rail Including at least two hubs and defined by a hub width which is higher than a wall thickness of each of the two side walls,
  wherein the profile body, the two side walls and the hub rail are each configured without joints in a radial direction of the at least two hubs in order to prevent radial insertion of a one of the transmission components into the hubs, and at least one of the two side walls is connected to the hub rail and the profile body in each case by a welded seam on an outer face of the at least one of the two side walls, the outer face being that side of the side wall which is accessible in an assembled state of the transmission housing, wherein the profile body is produced from a strip material which is reshaped by way of angled-over edges and wherein flat portions of the profile body lie between the angled-over edges, and further comprising another said hub rail inserted into a recess of the other one of the two side walls and fastened to the other one of the two side walls, wherein the two side walls and hub rails are of mirror-inverted configuration with respect to one another.

2. The transmission housing of claim 1, wherein the profile body is closed at least partially on both sides by the two side walls.

3. The transmission housing of claim 1, wherein the profile body is configured in one piece.

4. The transmission housing of claim 1, further comprising an inspection hole frame arranged for closing an open cross section of the profile body.

5. The transmission housing of claim 1, wherein the hub rail has a slot-shaped, oval, droplet-shaped, square or polygonal configuration.

6. A transmission, comprising:
a transmission housing as set forth in claim 1;
gearwheels arranged in a torque-transmitting manner in a transmission housing; and
a plurality of shafts supported in the transmission housing.

7. A housing series for transmissions, said housing series comprising a plurality of transmission housings, each said transmission housing including a profile body, two side walls configured to close the profile body, and a hub rail is arranged in at least one of the two side walls, wherein the profile body, the two side walls and the hub rail are each configured without joints, wherein at least one of the two side walls is connected to the hub rail and the profile body in each case by a welded seam on an outer face of the at least one of the two side walls, the outer face being that side of the side wall which is accessible in an assembled state of the transmission housing, wherein the profile body is produced from a strip material which is reshaped by way of angled-over edges and wherein flat portions of the profile body lie between the angled-over edges, and further comprising another said hub rail inserted into a recess of the other one of the two side walls and fastened to the other one of the two side walls wherein the two side walls and hub rails are of mirror-inverted configuration with respect to one another.

8. The housing series of claim 7, wherein the housing series Includes two transmission housings, with the two side walls of each of the two transmission housings being structurally identical, and with the profile body of one of the two transmission housings having a profile depth which is different than a profile depth of the other one of the two transmission housings.

9. The housing series of claim 7, wherein at least one of the plurality of transmission housings has a hydraulic housing filling degree of from 50% to 80% and/or a mechanical housing filling degree of from 20% to 50%.

10. The housing series of claim 7, wherein the transmission series Includes two transmission housings, with the two side walls of each of the two transmission housings being structurally identical, and with the hub rail of one of the two transmission housings having a number of bearing bores and/or an arrangements of bearing bores which are different than a number of bearing bores and/or an arrangements of bearing bores of the other one of the two transmission housings.

11. An industrial application, comprising:
a drive unit;
an output unit; and
a transmission housing connecting the drive unit and the output unit to one another, said transmission housing comprising a profile body configured to enclose transmission components, two side walls configured to enclose the transmission components in the profile body, and a hub rail inserted into a recess of one of the two side walls and fastened to the one of the two side walls, said hub rail including at least two hubs and defined by a hub width which is higher than a wall thickness of each of the two side walls, wherein the profile body, the two side walls and the hub rail are each configured without joints in a radial direction of the at least two hubs in order to prevent radial insertion of a one of the transmission components into the hubs, and at least one of the two side walls is connected to the hub rail and the profile body in each case by a welded seam on an outer face of the at least one of the two side walls, the outer face being that side of the side wall which is accessible in an assembled state of the transmission housing, wherein the profile body is produced from a strip material which is reshaped by way of angled-over edges and wherein flat portions of the profile body lie between the angled-over edges, and further comprising another said hub rail inserted into a recess of the other one of the two side walls and fastened to the other one of the two side walls, wherein the two side walls and hub rails are of mirror-inverted configuration with respect to one another.

* * * * *